A. W. FRENCH.
DEVICE FOR POISONING INSECTS.
APPLICATION FILED APR. 20, 1914.

1,186,178.

Patented June 6, 1916.

Witnesses:—
A. L. McGee
Richard Sommer

Inventor
Alfred W. French
By Wilhelm & Parker
Attorneys.

UNITED STATES PATENT OFFICE.

ALFRED W. FRENCH, OF PIQUA, OHIO.

DEVICE FOR POISONING INSECTS.

1,186,178.  Specification of Letters Patent.  Patented June 6, 1916.

Application filed April 20, 1914. Serial No. 833,067.

*To all whom it may concern:*

Be it known that I, ALFRED W. FRENCH, a citizen of the United States, residing at Piqua, in the county of Miami and State of Ohio, have invented a new and useful Improvement in Devices for Poisoning Insects, of which the following is a specification.

This invention relate to devices for poisoning flies or other insects, and more particularly to devices of this kind having a closed container or receptacle which contains poisoned liquid and which has means for feeding the liquid in small quantities out of the receptacle where it is accessible to insects. In devices of this kind as heretofore made, the poisoned liquid in the container is conducted to the surface of the container by means of tufts or wicks of absorbent material. It was found, however, that these tufts or wicks would gradually become clogged owing to the liquid evaporating and leaving the matter in solution therein on the wicks. The wicks would then fail to draw the liquid freely to the surface of the container and thereby greatly decrease the efficiency of the device.

The objects of this invention are to provide a device of this kind comprising a closed receptacle which is adapted to contain a considerable quantity of liquid and which is provided with means operable at will for feeding small quantities of the liquid to the surface of the receptacle where it is accessible to the insects; also to improve the construction of devices of this kind as hereinafter specified.

Figure 1:
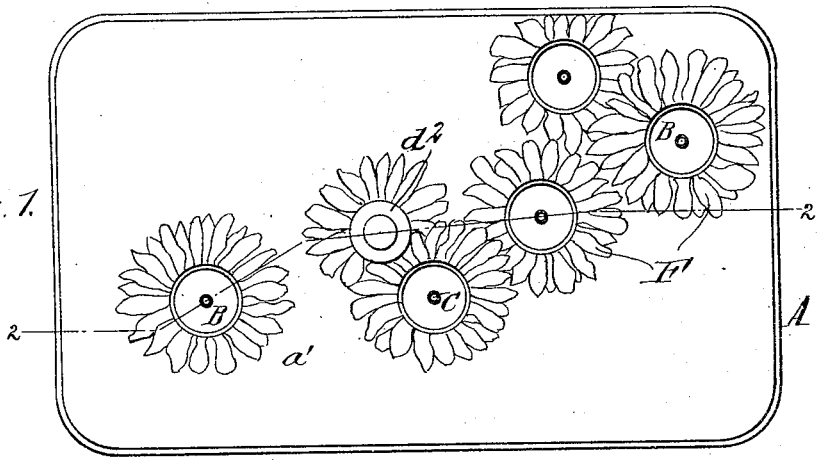
Figure 2:
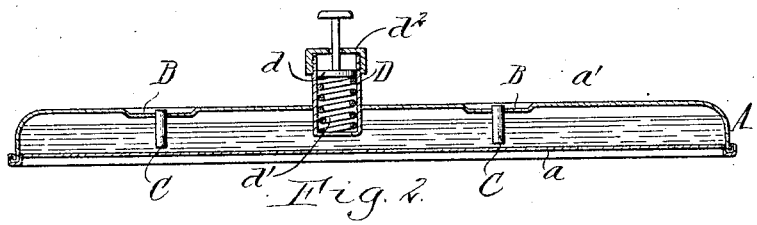
Figure 3:
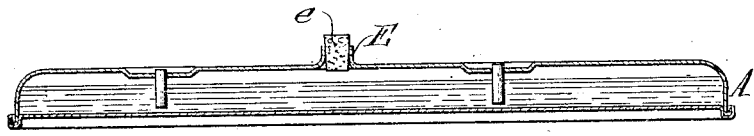

In the accompanying drawings: Figure 1 is a plan view of an insect destroying device embodying the invention. Fig. 2 is a sectional elevation thereof on line 2—2, Fig. 1. Fig. 3 is a similar sectional elevation of a device of slightly modified construction.

A represents the receptacle for the poisoned liquid, which may be of any suitable construction, but which is preferably comparatively shallow having an upper surface of considerable area. The receptacle has a bottom $a$ and a top $a'$ which, in the construction shown, has its edges bent downwardly and secured to the bottom, thereby forming side walls for the receptacle. The top of the receptacle is provided with any suitable number of shallow depressions B forming cups adapted to contain a small quantity of the poisoned liquid. Each depression is provided with a tube C extending into the receptacle in close proximity to the bottom thereof. The upper ends of the tubes extend slightly above the bottom of the depression B but are below the level of the top face of the receptacle. Liquid is forced from the receptacle A upwardly through the tubes and into the depression B. By so constructing the device that the upper end of the tubes extend slightly above the bottom of the depression, only a limited quantity of liquid will remain in the depressions and any excess of liquid will flow back into the receptacle through the tubes.

Any suitable means may be employed for forcing the liquid upwardly through the tubes into the depressions B in the top of the receptacle. In the construction shown in Figs. 1 and 2, a tube or cylinder D is secured to the top of the receptacle and a piston $d$ is slidably arranged therein. By depressing the piston, the increased pressure within the receptacle A forces liquid upwardly through the tubes. A spring $d'$ may be used to return the piston to its upper position after the same has been depressed. $d^2$ represents a cap which closes the top of the cylinder D. In order to fill the receptacle the cap and piston are removed from the cylinder and the liquid is poured through the cylinder into the receptacle A.

In the construction shown in Fig. 3, the liquid is forced upwardly through the tubes by merely depressing the top of the receptacle, the elasticity of the top being depended upon to return it to its normal position after the pressure is removed. In this construction the top is provided with an upwardly extending filling tube E, through which the liquid can be introduced into the receptacle, and which is closed by a cork or stopper $e$. Representations of flowers, as indicated at F, may be painted or stamped on the top of the receptacle, if desired to attract insects to the poison in the depressions B.

The device described has the advantage that it does not become inoperative owing to a clogging up of any parts. When the liquid in the depressions in the top evaporates, it can readily be replaced by fresh liquid from the receptacle by either depressing the piston or the top of the receptacle, depending upon which construction is employed. The upper ends of the tubes projecting above the bottom of the depressions prevent the liquid forced out through the tubes from being sucked back into the receptacle when the pressure within the same is decreased. If the liquid within the depressions attains a level higher than the upper ends of the tubes, the superfluous liquid will, however, flow back into the receptacle, so that the overflowing of the liquid in the depressions is prevented.

I claim as my invention:

1. A device for destroying insects comprising a receptacle for poisoned liquid having a top provided externally with a container constructed to contain a small quantity of said liquid, and means for conducting liquid from the receptacle upwardly into said depression and for returning superfluous liquid from said depression into said receptacle, said receptacle having provision for forcing liquid from said receptacle through said conducting means into said container.

2. A device for destroying insects comprising a receptacle for poisoned liquid having a top provided with a depression adapted to contain a small quantity of said liquid, a tube projecting from said depression into said receptacle, the upper edge of said tube extending above the bottom of said receptacle and below the upper surface of the top, and means for forcing liquid from the receptacle upwardly through said tube into said depression.

3. A device for destroying insects comprising a receptacle for poisoned liquid having a top provided with a depression adapted to contain a small quantity of said liquid, a tube projecting through said top into said receptacle and terminating at its upper end slightly above the bottom of said depression, and means for forcing the liquid through said tube into said receptacle.

4. A device for destroying insects comprising a receptacle for poisoned liquid having a top provided with a depression adapted to contain a small quantity of said liquid, a tube secured to said top and extending through said top and into said depression above the bottom thereof, means for forcing liquid through said tube into said depression, said depression having an overflow orifice above the bottom thereof for returning superfluous liquid into said receptacle.

5. A device for destroying insects comprising a receptacle for poisoned liquid having a top provided with a depression adapted to contain a small quantity of said liquid, a tube projecting from said depression into said receptacle and extending through said top, and an air pump adapted to increase the air pressure within said receptacle to force liquid through said tube into said depression.

Witness my hand, this 14th day of April, 1914.

ALFRED W. FRENCH.

Witnesses:
CHARLES B. UPTON,
D. S. LINDSEY.

Copies of this patent may be obtained for five cents each, by addressing the "Commissioner of Patents, Washington, D. C."